Nov. 1, 1955    J. BORDE    2,722,214
CONTAINER RECEIVING DEVICE
Filed June 11, 1951
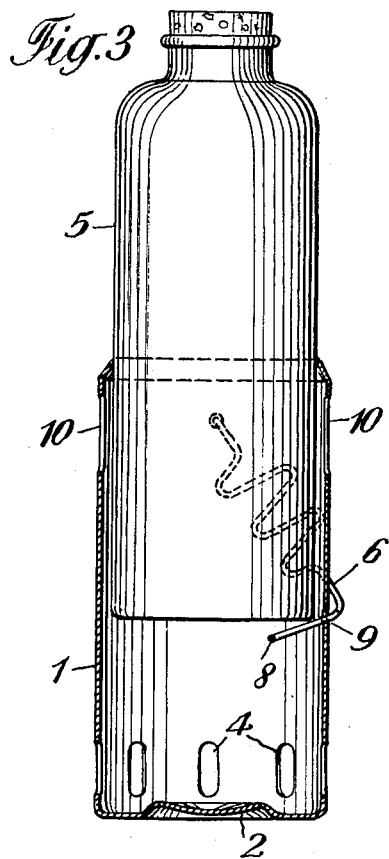
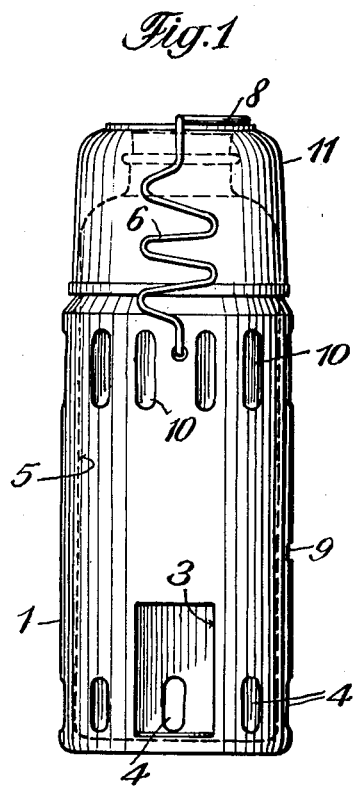
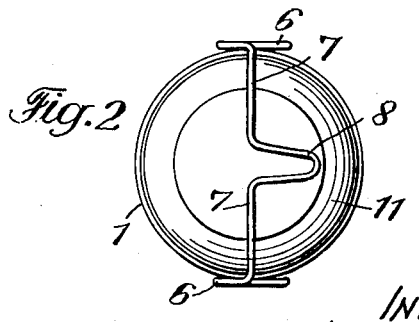
INVENTOR:
Josef Borde
by
E. F. Wenderoth atty ವ
United States Patent Office 2,722,214
Patented Nov. 1, 1955

2,722,214

CONTAINER RECEIVING DEVICE

Josef Borde, Zurich, Switzerland

Application June 11, 1951, Serial No. 230,968

Claims priority, application Switzerland June 16, 1950

2 Claims. (Cl. 126—261)

This invention relates to a device for receiving a container, in particular a container shaped as a bottle or the like.

One object of the invention is to provide a device of the said kind by which a container is supported in a suitable way for introducing heating means, such as solid fuel or a liquid or gaseous fuel burner, and for operating these means, under the bottom of the container for heating the latter and its contents.

Another object of the invention is to provide means affording a considerable reduction in space for the device of the said kind when same is not in use for heating purposes.

A further object of the invention is to provide means facilitating the transformation of such a device into a handy and sturdy package enclosing the container and preferably also a drinking cup.

Other objects and advantages of the invention will appear from the description now to follow, by way of example, of an embodiment thereof, with reference to the accompanying drawing in which:

Fig. 1 is a side elevational view of the device in packed condition ready for transport;

Fig. 2 is a top plan view of the device shown in Fig. 1; and

Fig. 3 is a side elevational view of the device, with one tubular element shown in longitudinal section and in the position ready for heating a second tubular member or bottle-like container.

Referring more specifically to the drawing, the device comprises a cylindrical tubular member 1 having an integral bottom 2. In the lower part of its side wall, there is shown a relatively large opening 3 facilitating placement of suitable fuel or other heating means on the bottom 2 from without member 1, and further a series of openings 4 are spaced from each other along the circumference and adjacent said bottom wall 2 to permit the access of combustion air. Solid fuel tablets may be used, or a liquid fuel burner may be placed on bottom 2.

The tubular member 1 is adapted to receive a bottle-like container 5 of somewhat smaller diameter than the inner diameter of member 1. This container may be slid for support into the tubular member 1 to rest on the bottom 2 of the latter, as shown in Fig. 1, the upper part of the container 5 then projecting from the open top of the side wall of said supporting member. A U-shaped wire bracket 6 with two legs bent in zigzag shape has a transversal yoke 7 having a nose 8 formed by a bend in the wire, the free ends of said legs being hinged on the upper part of the side wall of member 1.

As shown in Fig. 3, the wire bracket 6 can be swung downwards, whereby a reduced or tapered portion of nose 8 extends into the interior of member 1 through an opening 9 provided in the side wall of member 1 and positioned about midway the height of said side wall. In this position, nose 8 provides an abutment for supporting the bottle-like container 5 in working position of the device suitable for heating the bottle 5 and its contents.

The nose 8 is tapered in plan form, so that the length by which it projects into the supporting member 1 is limited as the wire abuts laterally against the rim of opening 9. With the bottle-like container 5 supported in this position (Fig. 3), the fuel can be placed on the bottom 2 and ignited to heat the container 5 and its contents by the flame and the ascending hot gases. These rise through the annular gap between the inner surface of the side wall of the supporting member 1 and the outer wall surface of container 5, and escape through upper openings 10 provided in the side wall of supporting member 1 and located adjacent the open top end thereof.

In the packed condition shown in Fig. 1, closure means in the form of a drinking cup 11 is placed in inverted position over the upper part of container 5, and when bracket 6 forming also a part of said closure means is swung into the position as shown, its yoke 7 engages the bottom of cup 11. Due to their zigzag shape, the side legs of bracket 6 are resilient and firmly press the cup 11 against the top end edge of said supporting member 1 to close the latter at its upper end. In this packaged condition, the device thus assembled is easily transportable and may be placed for instance, into a bag where it does not take up much space.

It can thus be seen that there has been provided according to the invention a device for holding a bottle and like container comprising a first tubular member having a side wall, an open top end and a bottom wall connected to said side wall, said first member being provided with a plurality of openings in said side wall, some of said openings being located adjacent said bottom wall, whereby air may be admitted to the interior of said first tubular member through said latter openings, a second tubular member movably received in said first tubular member, closure means for said second tubular member and interconnecting said first tubular member with said second tubular member, said closure means including a substantially U-shaped bracket element provided with two legs having ends pivotally engaging with other of said openings provided in the side wall of said first tubular member, whereby said bracket element may be, respectively, swung to one position above and to another position below said top end, said element being provided with a transverse central nose piece having a reduced portion interconnecting said legs, said first tubular member being further provided with an opening positioned about midway the height of the said first tubular member between said open top end and said bottom wall, whereby said bracket element may be swung from said one position into said other position in which said reduced portion of said nose piece extends into said midway opening for engagement with said second tubular member to space same from the bottom wall of said first tubular member and to thereby provide access of air to the interior of said first tubular member through said openings located adjacent said bottom wall.

Having thus described the invention, what is claimed as new and desired to be secured by Letters Patent, is:

1. A device for holding a bottle and like container comprising a first tubular member having a side wall, an open top end and a bottom wall connected to said side wall, said first member being provided with a plurality of openings in said side wall, some of said openings being located adjacent said bottom wall, whereby air may be admitted to the interior of said first tubular member through said latter openings, a second tubular member movably received in said first tubular member, closure means for said second tubular member and interconnecting said first tubular member with said second tubular member, said closure means including a substantially U-shaped bracket element provided with two legs having ends pivotally engaging with other of said openings provided in the side wall of said first tubular member, whereby said bracket element may be, respectively, swung to one position above and to another position below said top end, said element being provided with a transverse central nose piece having a reduced portion interconnecting said legs, said first tubular member being further provided with an opening positioned about midway the height of the said first tubular member between said open top end and said bottom wall, whereby said bracket element may be swung from said one position into said other position in which said reduced portion of said nose piece extends into said midway opening for engagement with said second tubular member to space same from the bottom wall of said first tubular member and to thereby provide access of air to the interior of said first tubular member through said openings located adjacent said bottom wall.

2. A device according to claim 1, wherein additional openings are provided in the side wall and located adjacent said top end of said first tubular member and approximately at the level at which said other openings are disposed, which engage the ends of the legs of said bracket element.

References Cited in the file of this patent

UNITED STATES PATENTS

| | | |
|---|---|---|
| 426,826 | Libbey | Apr. 29, 1890 |
| 589,667 | Montaque | Sept. 7, 1897 |
| 894,660 | Keen | July 28, 1908 |
| 936,482 | Seeley | Oct. 12, 1909 |
| 1,015,455 | Neesham | Jan. 23, 1912 |
| 1,685,768 | Noble | Sept. 25, 1928 |
| 2,176,865 | Floyd | Oct. 17, 1939 |
| 2,539,581 | Holden | Jan. 30, 1951 |

FOREIGN PATENTS

| | | |
|---|---|---|
| 8,816 | Switzerland | July 30, 1894 |
| 37,578 | Australia | June 11, 1909 |
| 481,089 | France | Aug. 8, 1916 |